United States Patent [19]

Tenniswood

[11] 4,389,056

[45] Jun. 21, 1983

[54] WHEELCHAIR

[75] Inventor: David M. Tenniswood, Troy, Mich.

[73] Assignee: Creative Controls, Inc., Troy, Mich.

[21] Appl. No.: 198,728

[22] Filed: Oct. 20, 1980

[51] Int. Cl.³ .............................................. B62B 11/00

[52] U.S. Cl. ............................ 280/289 WC; 280/650; 296/65 R; 297/42; 297/DIG. 4; 410/23

[58] Field of Search ............... 280/242 WC, 289 WC, 280/5.3, 650, 43.24, 647, 648; 180/DIG. 3; 410/9, 10, 12, 22, 23, 30, 51, 96; 414/921, 462; 296/65 R; 297/42, 130, 134, 5, 6, DIG. 4

[56] References Cited

U.S. PATENT DOCUMENTS

| | | | |
|---|---|---|---|
| 3,955,847 | 5/1976 | Schiowitz | 410/23 X |
| 4,190,263 | 2/1980 | Powers | 280/242 WC |
| 4,257,644 | 3/1981 | Stephens | 410/12 X |
| 4,265,478 | 5/1981 | Korsgaard | 410/23 X |
| 4,326,732 | 4/1982 | Gall et al. | 280/650 X |

*Primary Examiner*—Robert J. Spar
*Assistant Examiner*—Donald W. Underwood
*Attorney, Agent, or Firm*—Burton, Parker & Schramm

[57] ABSTRACT

A motorized wheelchair tie-down system has been developed for use in vehicles by wheelchair bound driver or passenger. This system provides for automatic securement of the wheelchair to the vehicle by operation of a switch. The switch powers a motor causing a linkage system to lower a rear bar on the wheelchair into an anchor while a pivoting anchor carries the forward portion of the wheelchair into a locked position.

8 Claims, 20 Drawing Figures

WHEELCHAIR

DESCRIPTION

BACKGROUND OF THE INVENTION

Providing for mobility of handicapped adults requires not only development of equipment and devices which will allow independent operations of private vehicles, but development of adequate restraint systems to protect these handicapped drivers and occupants in vehicle collisions. Until recently, little concern and effort has been devoted to the latter area. As a result, handicapped individuals fortunate enough to have found a means for operating a vehicle are, in most cases, completely unprotected in the event of a crash.

While designing for impact protection of able-bodied vehicle occupants is a complex and difficult engineering problem, designing for the protection of handicapped individuals, with their special equipment and assisting devices as well as strength and mobility limitations, presents additional problems in crashworthiness design.

The conventional wheelchair in use today has not been designed with vehicle transportation and crashworthiness criteria as a primary concern. Consequently, its structural members cannot, in general, be relied upon to hold up under the large inertial forces required to restrain both the wheelchair and its occupant under vehicle crash decelerations. Yet for the wheelchair bound person, who has limited strength and mobility, it is advantageous to provide occupant restraint anchorage points on the wheelchair itself. It is also important for the person who wants to operate a vehicle from his wheelchair without assistance, to have a restraint system which is actuated automatically by the simple action of a switch.

SUMMARY OF THE INVENTION

The invention is a wheelchair tie down system which includes modifying the standard wheelchair by attachment of a pair of side plates preferably triangularly shaped inside the standard frame of the wheelchair. The top corners of the side plates provide a place for securely attaching a seatbelt for the wheelchair passenger. The lower corners of the side plates hold front and rear rods. These rods fit within the system anchoring device. The anchoring device tilts the wheelchair so the rear rod is lowered from its normal position and then moved forward into the rear anchor. The front rod is secured by the second anchoring device which preferably pivots upward to contact and hold the front rod. The tilting of the wheelchair can be accomplished in several ways, including pivoting the wheelchair about its rear wheels by lifting the front rod. An alternative embodiment tilts the wheelchair by lowering the rear wheels into wells positioned beneath the rear wheels. Yet a third embodiment lets the wheelchair frame be moved relative the rear wheels so the wheelchair may tilt about the front wheels.

DESCRIPTION OF PREFERRED EMBODIMENTS

Figure 1:
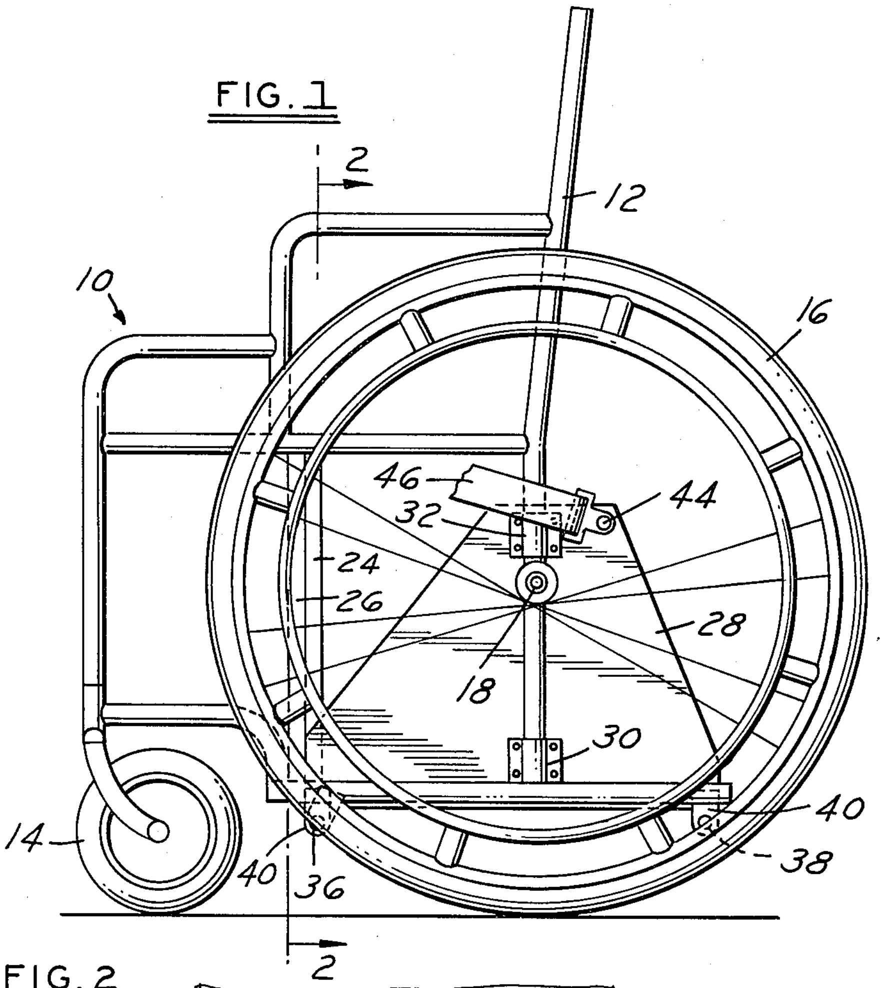
FIG. 1 is a side view of a wheelchair embodying the invention.

The conventional wheelchair 10 in use today normally is constructed of a tubular frame 12 to which are attached a pair of small caster wheels 14. A pair of large wheels 16 are positioned on each side of the chair on axle 18. The sides of the wheelchair are joined by cloth to form a chair back 20 and seat 22. To hold the chair sides apart there are provided cross-tubes 24, 26. These cross-tubes are pivoted so that the chair may be folded with the sides of the wheelchair adjacent one another.

Figure 2:
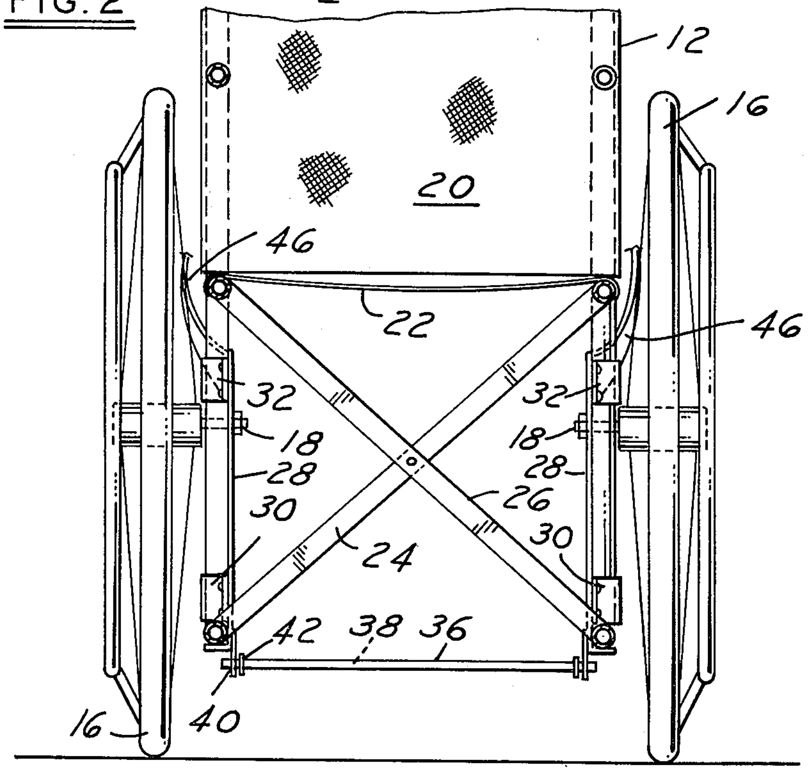
FIG. 2 is a partial rear view of the wheelchair.
Figure 3:
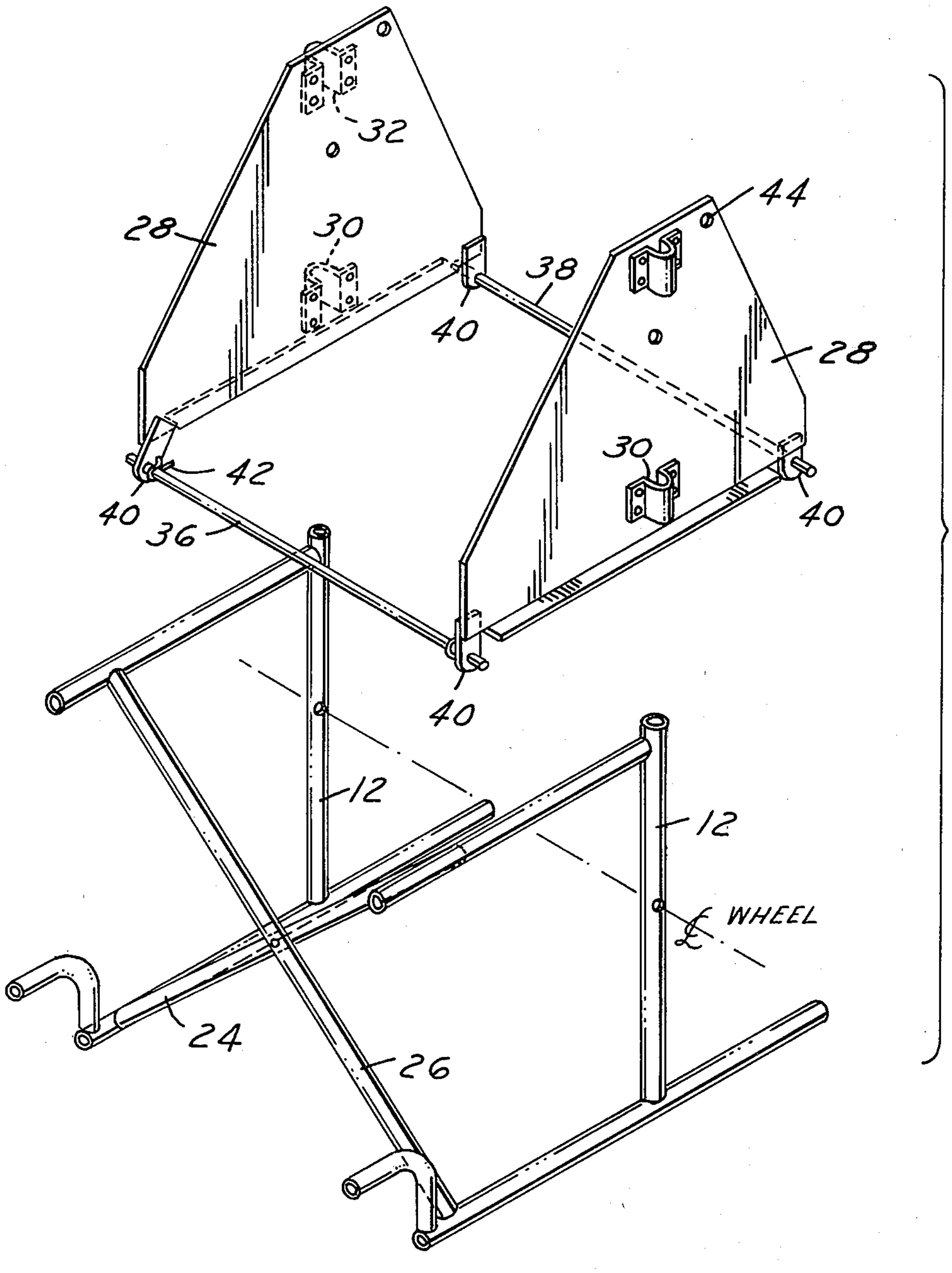
FIG. 3 is a disassembled view of the wheelchair main and secondary frames.
Figure 4:
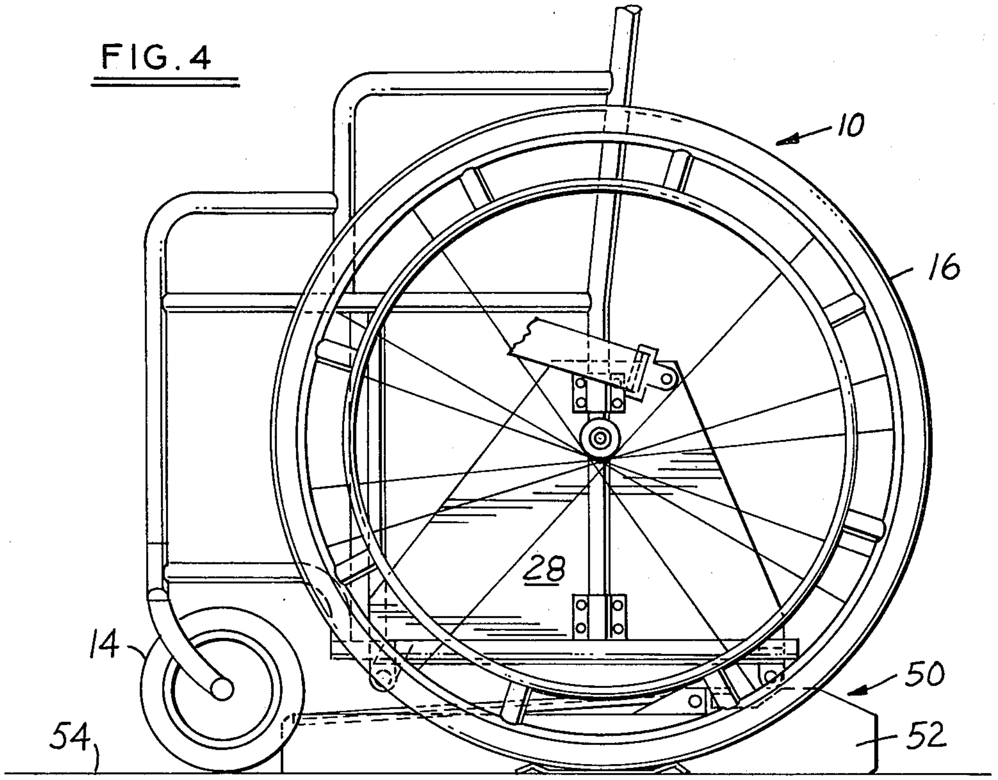
FIG. 4 is a side view of the wheelchair and an anchoring device further embodying the invention.

As best shown in FIGS. 1–3, the conventional wheelchair has been modified by the attachment to each side of the wheelchair of triangularly shaped plates 28. These are clamped at 30 and 32 to the tubing of the wheelchair. The plates should be on the inside of the side frame. As shown in FIG. 3, holes are provided in plates 28 through which can pass the axle of the large wheels 16. Extending between the pair of plates 28 are a pair of rods 36 and 38, which are removably positioned in the depending rod retainers 40 by retaining pins 42. When pins 42 are removed, the rods can be slid out of the plates so the wheelchair may be folded. There is a second hole 44 in each of the plates to allow attachment of seatbelt 46 directly to the plate, the plate acting to transfer directly all forces from the seatbelt to the rods 36 and 38.

An anchoring device 50 acts to join the wheelchair to the vehicle. In the embodiment shown in FIGS. 4–9, this takes the form of a platform 50 comprised of the housing 52 which is to be securely bolted to the vehicle floor 54. The housing has a rear opening covered by removable plate 56 which allows access to accuator means 58. A motor which is part of the accuator means will supply a torque to piston 64 until a predetermined resistance is reached at which point the motor will stall and turn itself off. The housing has a second large opening which is substantially covered by pivoting cover 60. This cover is attached to the housing along its rear edge by pivot 62 to allow easy movement of the cover. Within the platform is positioned piston 64 having a forward moving piston rod 66. The piston rod is of a screw type so that it will maintain whatever position it is in when motor 58 is turned off. This piston rod is joined by link 68 to pivoting rod 70. The pivoting rod has positioned at each of its ends movable hooks 72. The other end of each anchor is joined to rod 74. Rod 74 is rotatably anchored in the housing and provides a pivot for the hooks 72. Also provided along rod 70 are a pair of rollers 76 on which rests cover 60. Placed behind the pivot 62 is a rearward facing ledge 80 which acts as the rear anchor.

Provided as part of this embodiment are a pair of positioning plates 78 which as with the platform are bolted to vehicle floor 54. The positioning plates have a forward and rearward raised portion so that when the occupant positions the large wheels between the raised portions, he knows the chair is positioned.

Figure 5:
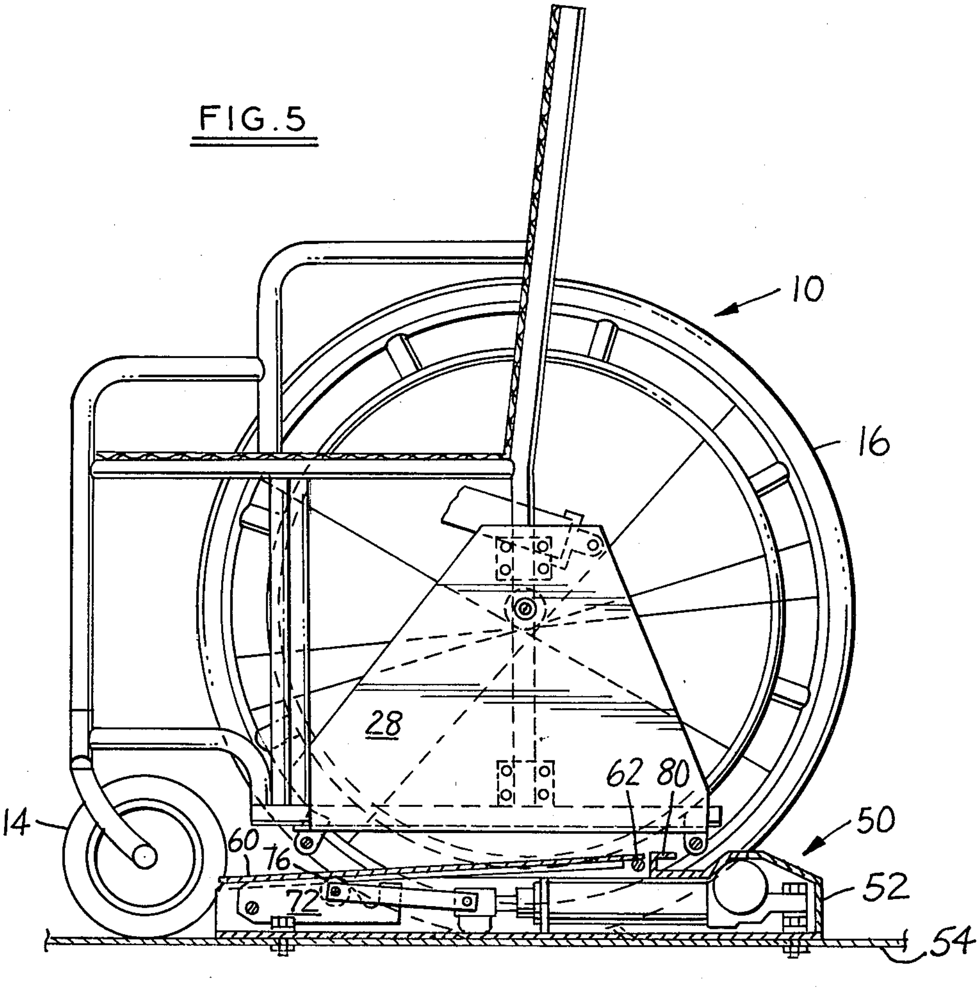
FIG. 5 is a section through the middle of the wheelchair and anchoring device when the anchoring device is in its non-anchored position.
Figure 6:
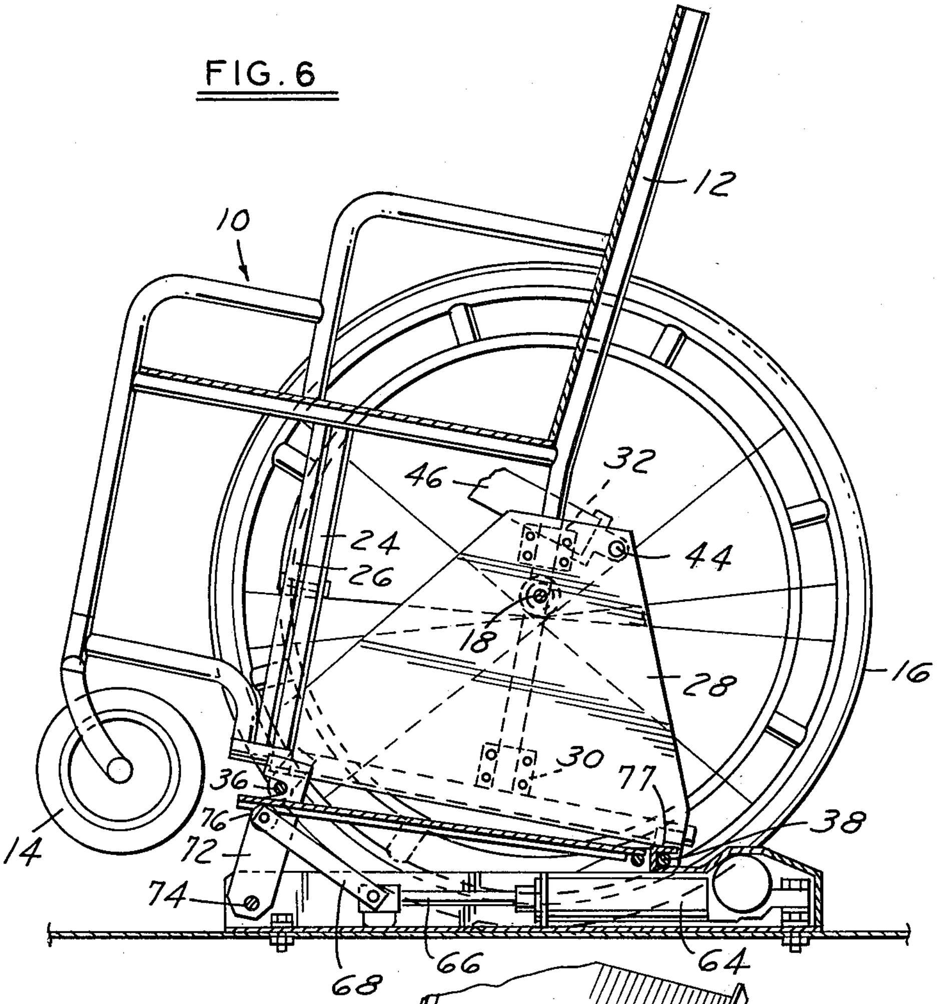
FIG. 6 is a view similar to FIG. 5 with the device in its anchored position.
Figure 7:
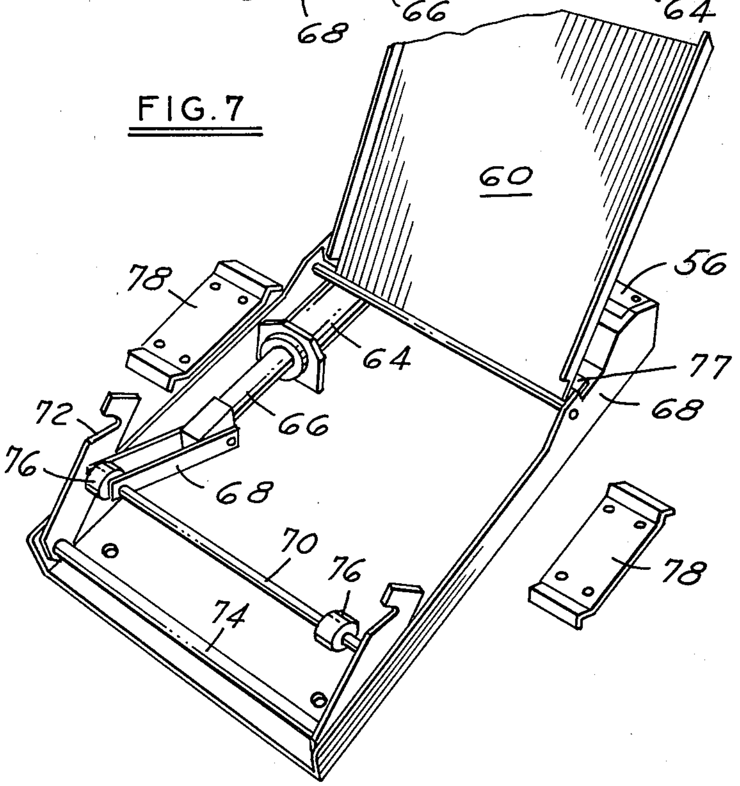
FIG. 7 is a perspective view of the anchoring device with its cover open.
Figure 8:
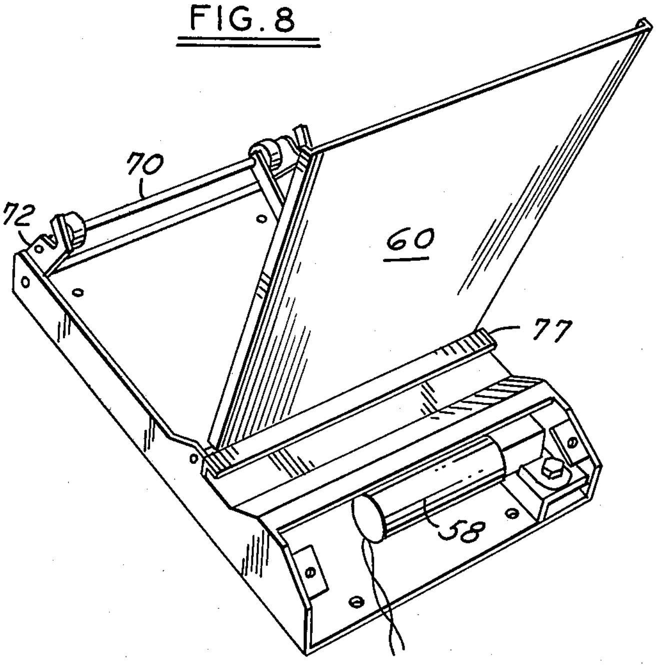
FIG. 8 is a rear perspective view of the anchoring device with its cover open and the rear panel removed.
Figure 9:
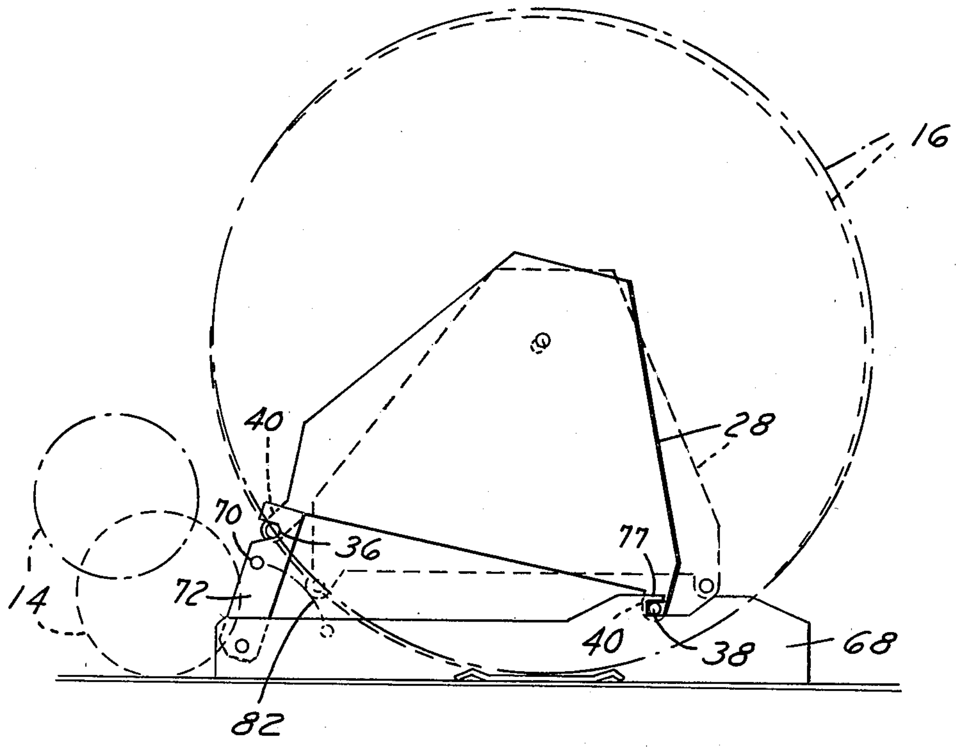
FIG. 9 shows the geometry involved in the anchoring of the wheelchair.

To use the anchoring device, it is placed in a nonoperative position which has the piston rod retracted. At that point link 68 holds the forward anchors in their rearward reclining position as shown in FIG. 5. In this position the wheelchair can be rolled on each side of the platform without contacting the device itself due to the clearance between the top of the platform and the positioning of rods 36 and 38 which allows for easy movement of the wheelchair prior to operation of the anchoring device. The positioning plates 78 are used so the wheelchair occupant may know when he is correctly positioned with the rear rod above and behind the rear anchor. When each of the large wheels 16 rest in their corresponding positioning plates, the device is ready for operation. A button (not shown) is pushed energizing the motor 58 which causes piston rod 66 to be extended. As shown in FIG. 9, this causes pivot rod 70 to move in an arc represented by the dotted line designated 82. During the initial portion of the arc, a major component of the movement of the rod is upward. Thus rollers 76 lift cover 60 which, in turn, abuts and lifts the front rod 36 of the wheelchair. Upward movement of front rod 36 causes the whole wheelchair to pivot on the large wheels' axis 18. This causes the rear rod 38 of the wheelchair to be moved downward below the upper lip of anchor 80. As the piston rod continues to extend, the major component of the movement of the pivot rod 70 becomes a forward motion and the cover essentially stops rising. The major activity at this point is caused by engagement of the hooks 72 with the front rod 36 of the wheelchair. The rod is grasped by the hooks and pulled forward seating the rear rod 38 of the wheelchair within the rear anchor. Once the rear rod is positioned and can no longer be pulled any further forward, the motor stalls out stopping movement and causing the wheelchair to be securely held in place. It should be noted that during the last period of the upward movement of the cover, the rear rod abuts surface 79 of the platform and therefore cannot be lowered any further. The rear rod then becomes the point about which the wheelchair pivots rather than the axis of the large wheels. Thus, the rear wheel will be slightly raised off the floor of the vehicle so it may be freely spun. The front caster wheels 14 of the wheelchair also are raised from the floor due to the lifting of the front rod and can also be freely spun. In this position, all forces felt by the seatbelt will be transferred directly to the triangularly shaped plates which in turn transfer their forces to the anchoring platform and the vehicle body. No major forces are experienced by the weak conventional frame of the wheelchair. The motor is reversed to free the wheelchair.

Testing a similar embodiment has been undertaken using a 50th percentile male crash dummy (HSRI) weighing 165 pounds. The sled impact pulse was a 20 mph velocity differential generated by a 16 G (16 times gravity) constant deceleration pulse. Tests were conducted for both frontal and 33 degree oblique impact directions. In these tests, it was found that the rear retaining rod 38 absorbs the majority of the inertial forces by bending during impact. The only damage to the wheelchair itself was the bending of the front castor shafts caused by downward loading of the chair by the dummy and the fact that the front retaining rod pops out of the front anchors as the rear bar deforms during impact. Similar results were obtained for the 33 degree oblique impacts and good wheelchair restraint was provided with little damage to the wheelchair itself. It is estimated that during the 16 G test the occupant of the wheelchair at the time of peak belt force would receive only 12 G's due to deformation of rear retaining bar. Though not shown, use of an upper torso restraint yields even better results where one end of the restraint is attached to the vehicle and the other of the triangularly shaped plate 28. In the test embodiment, the only significant difference was the placement of plates 28 outside the side frames. Placement inside as described above significantly reduces bending of the rear bar in an impact while still absorbing the shock of impact.

A second embodiment of the anchoring device is shown in FIGS. 10–13. This embodiment and the third embodiment shown in FIGS. 14–21 involve situations where the seat is lowered during the anchoring of the chair. Often, if not in the majority of cases, for a wheelchair occupant to drive a car he will have to be lowered so to be given an appropriate viewing height. If the first embodiment is used, except for small individuals, upon anchoring the driver to be seated too high to have an adequate view of driving conditions.

Figure 13:
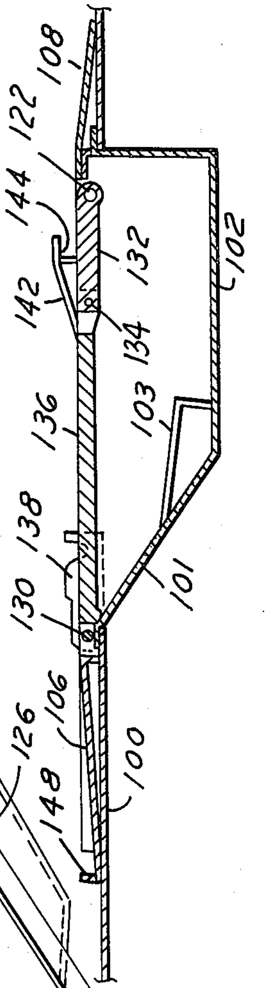
FIG. 13 is a side view of the anchoring device in its starting position.
Figure 12:
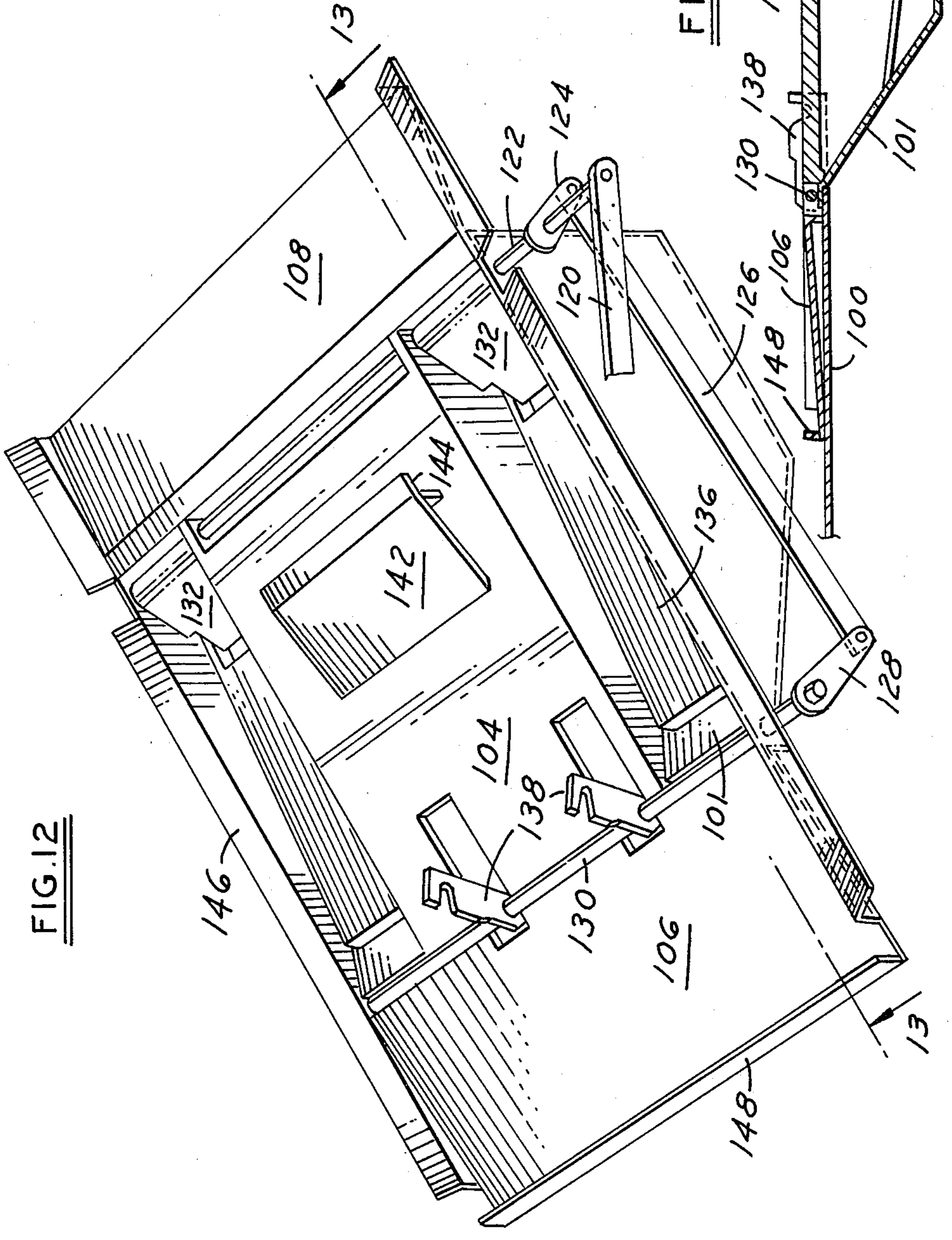
FIG. 12 is a perspective view of the second anchoring device partially moved toward the anchored position.
Figure 14:
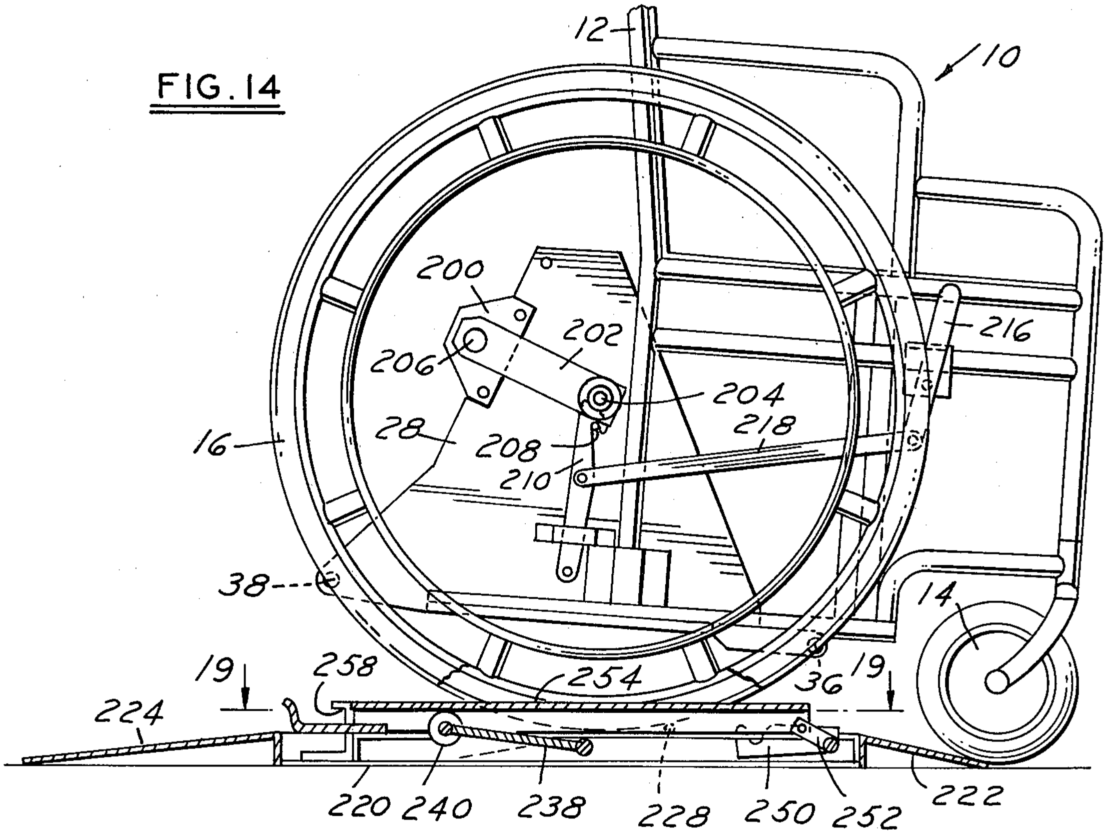
FIG. 14 is a side view of a third embodiment of the invention with the anchoring device taken along line 14—14 of FIG. 19 with the anchoring device in its starting position.
Figure 15:
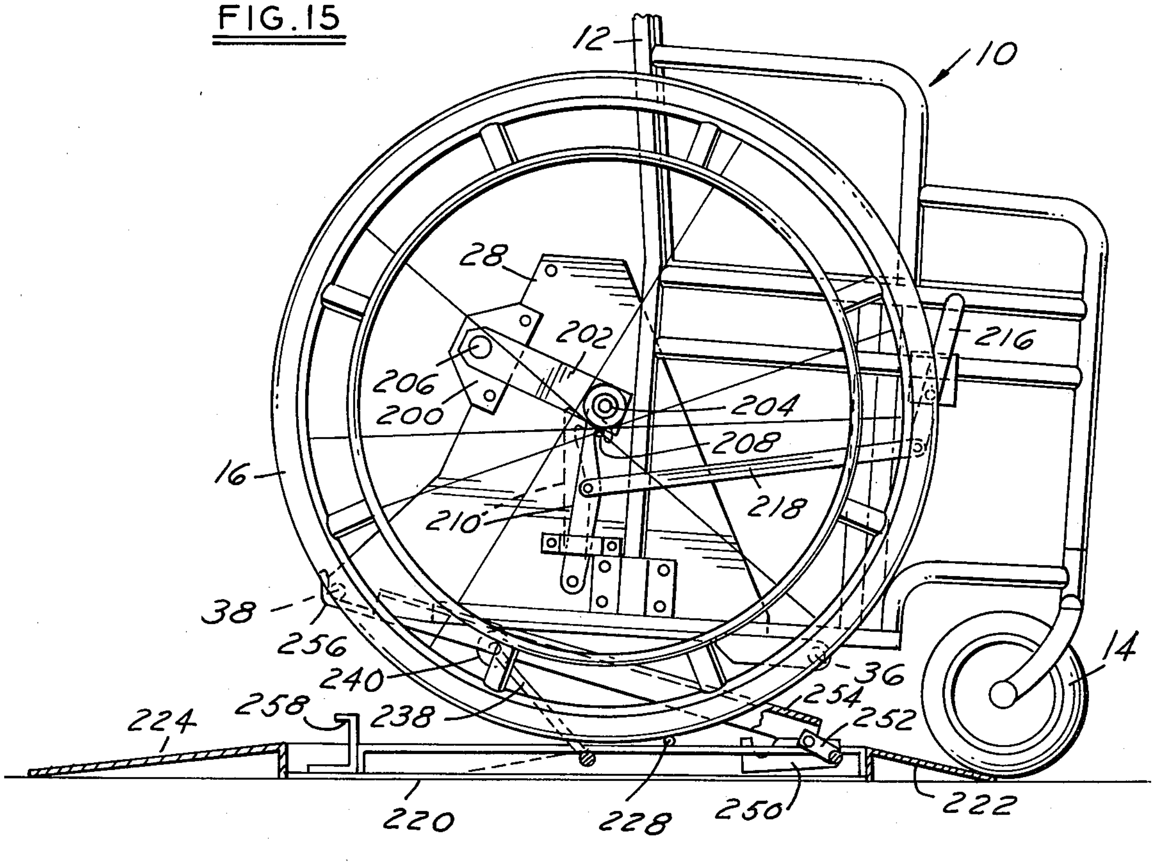
FIG. 15 is a view similar to FIG. 14 where the anchoring platform moves upward and lifts the rear rod of the wheelchair.
Figure 16:
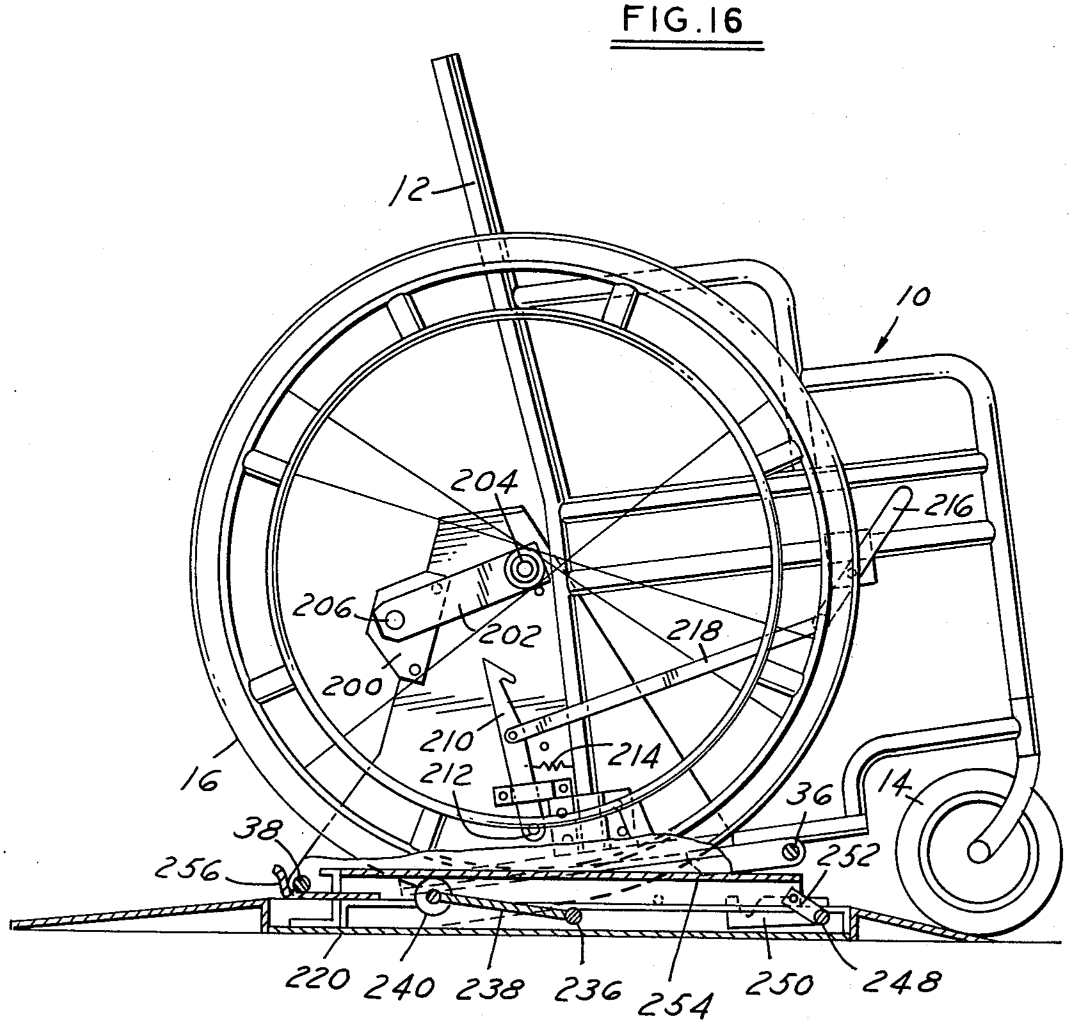
FIG. 16 is another view similar to FIG. 14 where the wheelchair has been tilted prior to being secured.

In the second embodiment the same modifications to the basic wheelchair are made. However, the anchoring device differs in certain aspects. In particular, the anchoring device is mounted in the floor rather than on it as in the first embodiment. Therefore, as shown in FIG. 13, the floor 100 of the vehicle is cut away to allowing the positioning for parts of the anchoring device. In particular, extending beneath the floor are a pair of wells 102, one for each large wheel. Covering the hole is base plate 104, which has attached forward ramp 106 and rear ramp 108. As with the first embodiment, there is an accuator 110 connected to a screw type piston 112. The piston is pivoted at 114 to a bracket 116 joined to the floor. The piston rod is pivoted at 118 to link 120. This link is rigidly joined to shaft 122. A bar 124 is also joined rigidly to shaft 122. This bar forms part of three bar linkage, the other bars of which are respectively 126 and 128. Bar 128 is rigidly attached to second shaft 130. Thus, rotation of shaft 122 acts through the three bar linkage to cause corresponding rotation of shaft 130. Shaft 122 passes through the rear end of wells 102 and one edge of plate 132 is attached to those portions of the shaft which pass through the wells. The opposite edge of plate 132 includes pivot 134 for platform plate 136. The platform plate is an elongated plate, one edge of which, as mentioned above, is pivoted to plate 132. The opposite longitudinal edge rests upon the forward surface of well 102. The width of plates 132 and 136 are such as to correspond to the width of the well 102 with enough clearance to allow movement of the plates within the wells. The length of plates 132 and 136 are such that when disposed horizontally, they form a cover for well 102. The forward surface of the well includes a downward sloping wall 101 and a downward sloping rest surface 103, the rest surface having a lesser slope than wall 101. The forward edge of platform plate 136 slides along the slope of wall 101 or rest surface 103 alternatively as shaft 122 is pivoted for a purpose to be described later.

On the forward shaft 130 there are a pair of hooks 138, each of which are provided with a cutaway recess 140 in base 104. The hooks are rigidly attached so to pivot as rod 130 rotates. Rod 130 is positioned just forward of the wells. Placed on the base plate 104 between the wells is a rear anchor 142, having along its rear end a recess 144.

To aid the wheelchair occupant in positioning the wheelchair for anchoring, the anchoring device includes side walls 146 and a forward wall 148.

Figure 10:
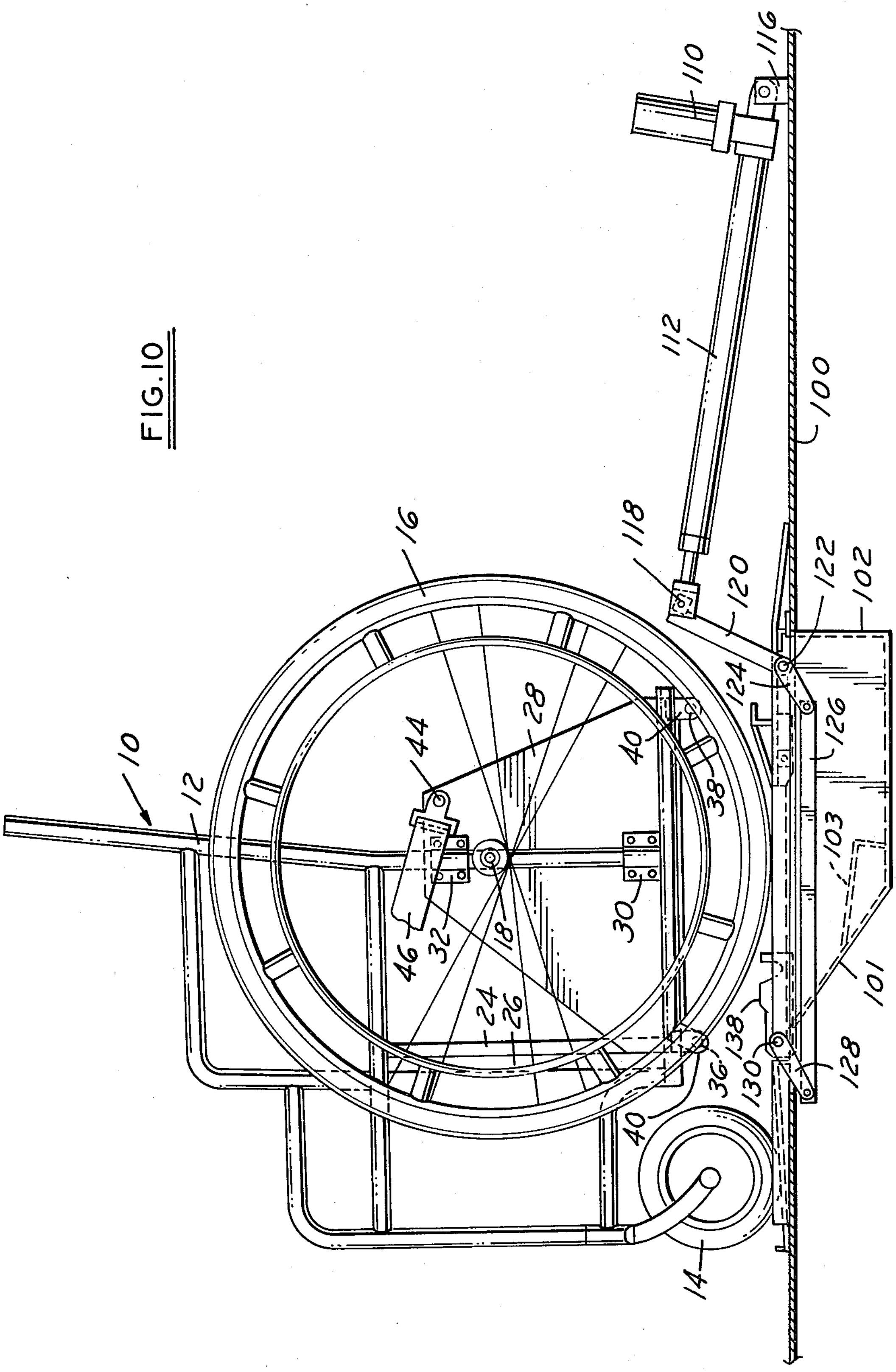
FIG. 10 is a side view of the wheelchair and a second anchoring device embodying the invention with the anchoring device in its non-anchored position.
Figure 11:
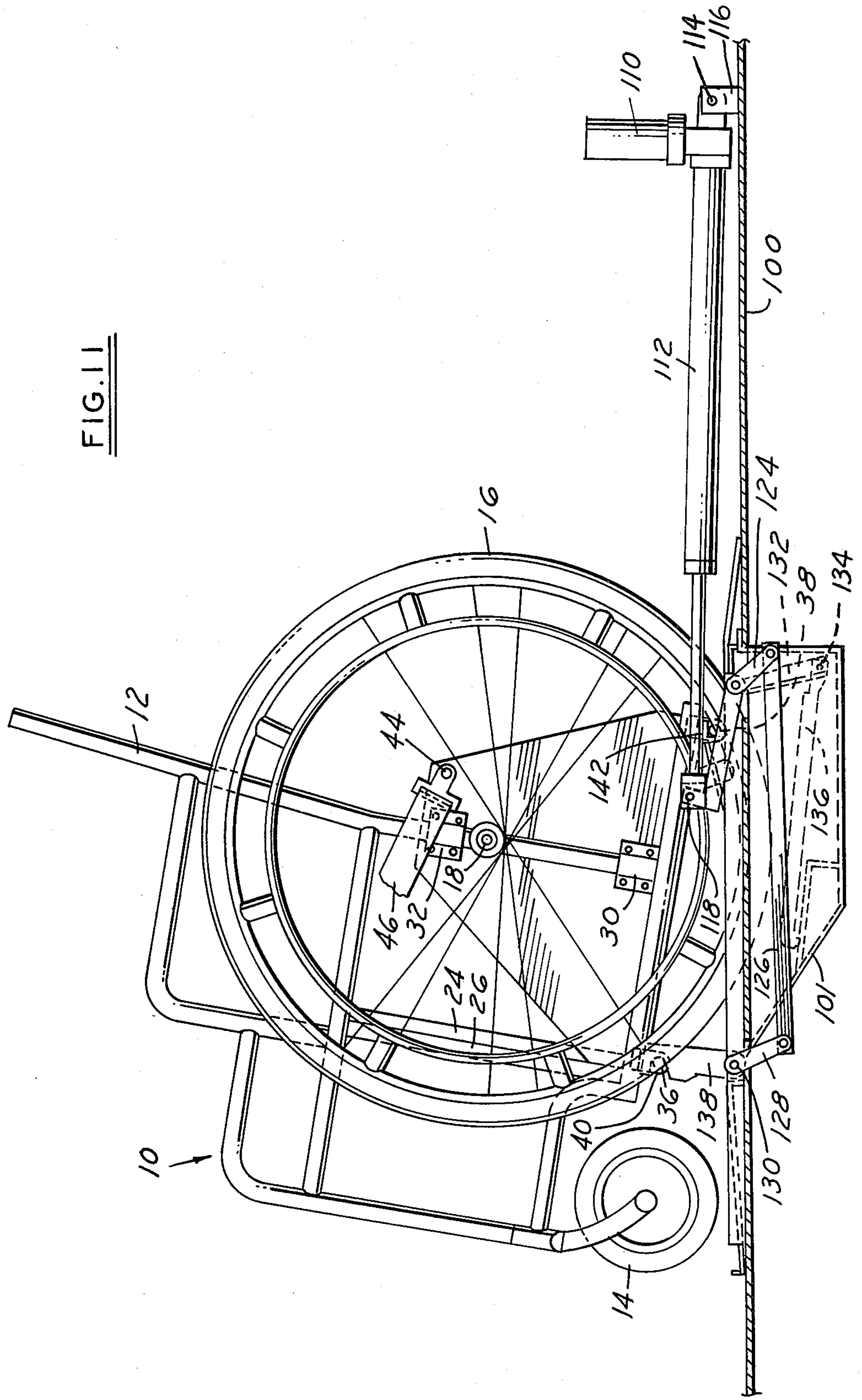
FIG. 11 is a view similar to FIG. 10 showing the wheelchair anchored.

In operation, the anchor works as follows: The wheelchair anchor is prepared for use by retracting the piston 112. This rotates shaft 122 so that plates 132 and 136 take a horizontal position. At the same time, shaft 130 is rotated by the three bar linkage so that hooks 138 are pivoted to their down position which is substantially within the base. This position is shown in FIG. 10. The wheelchair is then rolled onto the anchoring device. The wheelchair occupant may judge its position by contact with the side walls 146 and the forward wall 148. When he is positioned with the large wheels over wells 102, the motor 110 is activated by suitable means, such as a button (not shown). The piston rod is then extended causing shaft 122 to rotate in a counterclockwise position as seen in FIGS. 10 and 11. This in turn causes plate 132 to swing downward pulling with it plate 136 which drags along the downward sloping surface of wall 101. The wheelchair automatically rolls down the now sloping plate 136 until it reaches the now V-shaped juncture plates 132 and 136. Since the front castor wheels remain on the forward ramp, the wheelchair is tilted similar to the first embodiment. The downward movement of the rear of the chair continues until the rear rod 38 of the wheelchair abuts base 104. At this point, continued rotation of rod 122 merely acts to allow the large wheels to freely rotate.

At the same time shaft 122 is rotating, shaft 130 is rotating in a corresponding matter due to the three bar linkage. The initial rotation of shaft 130 will have no affect on the wheelchair and thus the only movement of the wheelchair will be the lowering tilt caused by the plates receding into the wells. However, upon suitable rotation, the hooks 138 will contact the forward bar 36 of the wheelchair. This will cause the rear bar 38 of the wheelchair to be moved forward into the recess of the rear anchor. As before with the first embodiment, the motor will stall out when the rear rod can move no further forward in the rear anchor and the wheelchair will be again securely held in place. It should be noted that while the predominant movement to the wheelchair caused by hooks 138 will be in a forward direction, a slight upward component is also present which will cause the front castor wheels to rise off the ground and be freely rotatable.

As before, to free the wheelchair, the accuator is reversed and the process takes place in the opposite sequence. It should be noted that support surface 103 is included in the wells to allow easier sliding of platform plate 136 when moving forward.

The third embodiment entails modifications of not only the anchoring device but also of the wheelchair. Again, the basic conditions of a pair of triangularly shaped plates is found in this embodiment. As shown in this embodiment, some departures from a strickly triangular shape may be made when taking into account the wheelchair's basic frame. Thus, a forward extending arm is welded to the side plates to correctly position the front rod. Preferably, the triangular shape is used. In particular, joined to triangularly shaped plates 28 are brackets 200 which pivotably support axle arm 202. On this arm a short axle 204 for a large wheel is attached. Thus the wheel is now free to move relative the chair around pivot point 206. To keep the wheel in place during normal operation, pin 208 is attached to the lower inner portion of the axle arm. This is normally grasped by hook 210, which is in turn pivoted at another point 212 to plate 28. When hook 210 grasps pin 208, the wheel will not move and the chair can be operated in a normal manner. The hook is urged to its grasping position by spring 214. However, the hook can be moved away from pin 208 by moving arm 216 which is connected to the hook by link 218 as will be described in more detail later.

Figure 20:
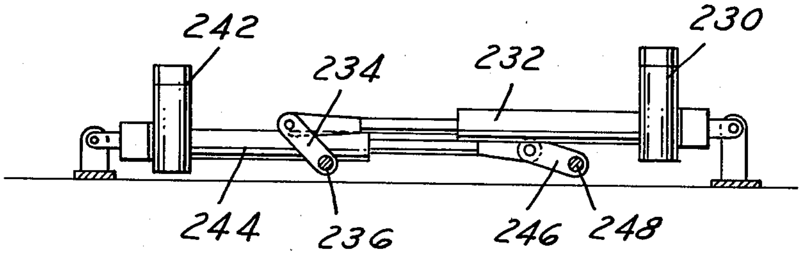
FIG. 20 is a side section view of the anchoring device taken along line 20—20 in FIG. 19.
Figure 17:
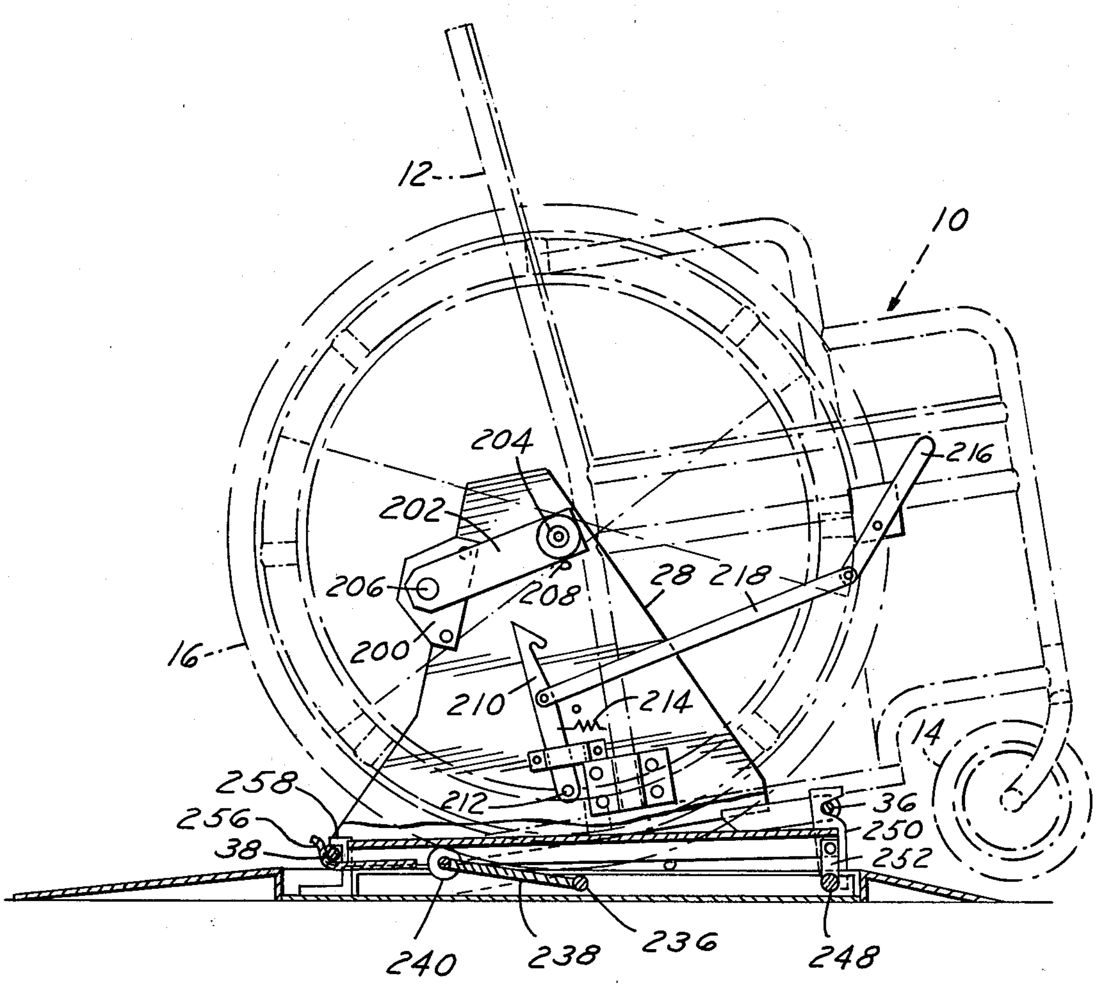
FIG. 17 is a view similar to FIG. 14 where the wheelchair is secured in position.
Figure 18:
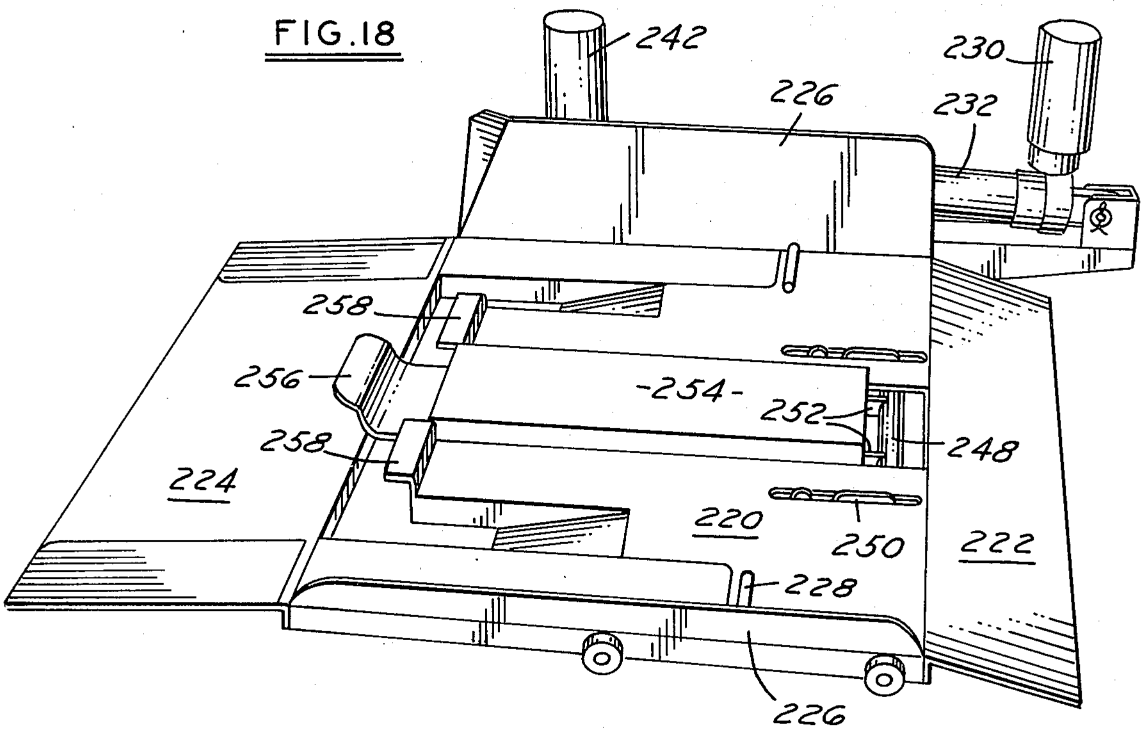
FIG. 18 is a perspective view of the anchoring device of this embodiment.
Figure 19:
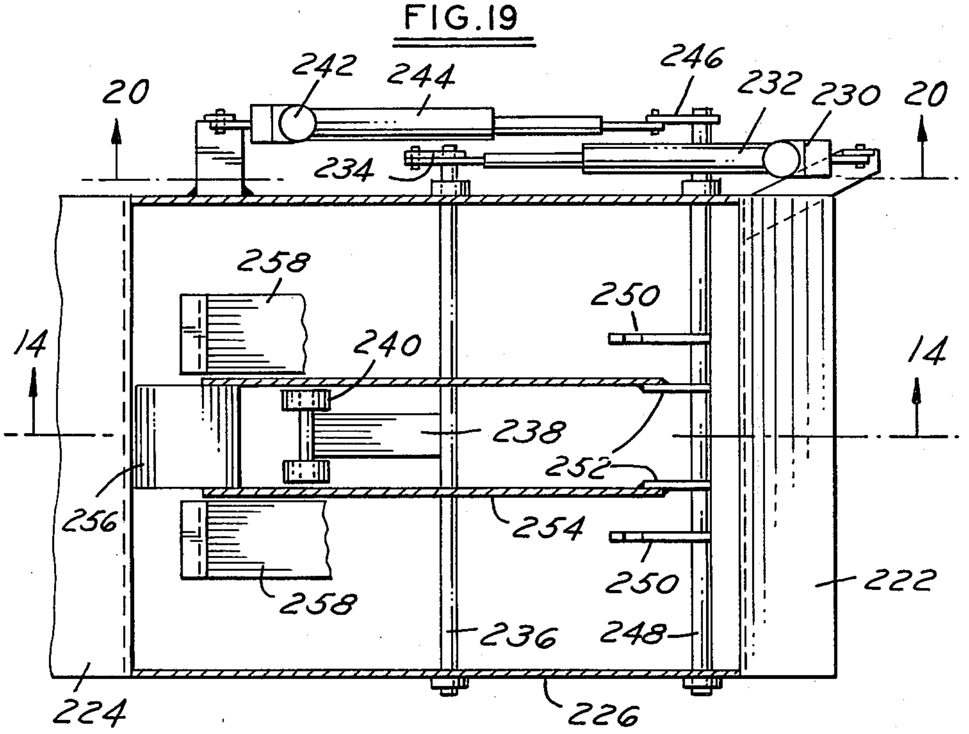
FIG. 19 is a top view of the anchoring device of this embodiment.

The anchor in this embodiment also differs from the earlier embodiments, though as in the second embodiment the seat will be in a lowered position when anchored. As shown in FIGS. 18–20, there is a base portion 220 having forward and rearward ramps 222, 224. The base is bolted to the floor of the vehicle to hold it in place. To allow for easy positioning of the wheelchair, there are provided side walls 226 and a pair of aligning bumps 228. Of course, as with the other embodiments, the wheelchair may be moved over the anchoring device when the device is not in use.

This embodiment makes use of a pair of accuators with a pair of screw pistons. The first accuator 230 is joined to piston 232 which, in turn, is joined by a link 234 to shaft 236. Arm 238 is rigidly joined to shaft 236. At the end of arm 238 are a pair of rollers 240. The other air accuator 242 operates piston 244 which, in turn, is joined by a link 246 to a second shaft 248. Rigidly attached to this shaft are a pair of hooks 250 and a pair of arms 252. The arms are placed at an angle to the hooks so that when the hooks lie horizontally the arms are slightly raised. Pivoted to the arms is platform 254. This elongated platform has rear rod positioning device 256 at the end opposite arms 252. The platform overlies arm 238 and its rollers and is positioned between a pair rigid anchors 258.

In operation, piston 232 is extended while piston 244 is retracted to prepare the anchoring device for use. This causes arm 238 and anchors 250 to lie substantially horizontal. No elements of the anchoring device act to interfere with movement of a wheelchair over the device. The wheelchair occupant then positions his wheelchair by abutting bumps 228 with the large wheels. By that time, motor 230 is activated by suitable means (not shown) so to retract piston 232. This pivots shaft 236 in a clockwise direction so to raise rollers 240 and in turn pivot platform 254. This continues until the large wheels are raised slightly off the ground by the positioning portion of the platform contacting and lifting the rear rod of the wheelchair. Motor 230 is then stopped. The weight of the wheels move the axle arm slightly downward, thereby allowing pin 208 to more easily move out of the grasp of hook 210. The unhooking is actually accomplished by moving the handle of arm 216 forward which, in turn, pivots hook 210 rearward letting pin 208 free. The axle arm can now rotate. At this point, motor 230 is reversed extending piston 232. This rotates the rollers 240 downward again, but since the large wheels are free to rotate around pivot point 206, the wheelchair continues to be lowered even after the wheels contact the base. The lowering continues until the platform again takes its starting position. However, the rear rod of the wheelchair remains seated in the positioning portion 256 of the platform. At this point, the rear rod of the wheelchair also lies beneath though to the rear of the stationary anchors 258.

To complete the securing of the wheelchair, the second motor 242 is activated so that piston 244 is extended. This rotates shaft 248 in a clockwise direction. The rotation of arm 252 causes the platform to move forward while shaft 248 pivots. At the same time, hooks 250 rotate upward to grasp the front rod of the wheelchair. Rotation continues until the rear rod of the wheelchair abuts the inner surface of the stationary anchors 248 at which time motor 242 stalls out. The rear portion of the positioning portion of platform 254 is moved forward so to effectively provide a rear wall to seal the entrance to the anchors. The wheelchair is now securely anchored in place. Due to the movement of the forward hooks in an arc, castor wheels are lifted off the base and thus freely rotatable in this position. However, due to the large wheels freely rotating axles, they will remain touching the ground. To release the wheelchair, the same process is used only in reverse.

I claim:

1. In a wheelchair of the type having a pair of light frame members, a pair of large rear wheels and small forward wheels, one of each pair being attached to and outward of each light frame member for moving the chair, and a seat extending between said light frame members, an improvement comprising;

- a pair of metal plates aligned along side the rear wheels, one of each plates on the inside of each light frame member and located below said seat;
- a first portion of each of said metal plates extending rearwardly and below where said large wheels are attached to said light frame and a second portion extending forwardly and below where said large rear wheels are attached to said light frame;
- a pair of cross bars, one of said cross bars extending between said first portions and the second set of cross bars extending between said second portions, said cross bars being rigidly but releasably held by said plates; a seat belt extending between said plates and over said seat for releasably retaining an occupant in said seat and attachment means for joining said seat belt to said metal plates.

2. In a wheelchair of the type having a seat, rear pair and forward pair of wheels for moving the chair, and a light framework holding the seat and connecting it to the wheels, an improvement comprising:

- a secondary rigid framework positioned inside of and attached to the light framework;
- a seatbelt to provide restraint for the occupant, that seatbelt being firmly attached to the secondary framework;
- attachment means joined to the secondary framework for engagement with wheelchair securing means, such attachment means comprising a pair of cross bars extending between a pair of metal plates; and
- said secondary framework comprising the pair of metal plates which are aligned alongside the rear wheels, each of said plates being substantially triangularly shaped with the top corner of each positioned near the lower rear corner of the wheelchair seat into which corner the seatbelt is attached and the cross bars extend between corresponding lower corners.

3. The improved wheelchair of claim 2 wherein at least one of the cross-bars is tubular.

4. The improved wheelchair of claim 2 wherein the wheelchair frame is comprised of two substantially planar frame portions, each of which support one rear wheel and one front wheel with the seat suspended between the portions and where the seat is collapsible so to allow the wheelchair frame portions to move adjacent one another and where the bars are removable.

5. The improved wheelchair of claim 2 wherein the rear wheels are movable in a substantially vertical direction relative the wheelchair frame.

6. The improved wheelchair of claim 5 wherein each rear wheel has a separate axle which is joined to one end of an axle arm, the other end of which is pivotably joined to the adjacent metal plate, the pivoting of the arm providing said substantially vertical movement.

7. The improved wheelchair of claim 6 wherein the rear wheel axes are held in one position by releaseable hook means.

8. The improved wheelchair of claim 1 wherein at least one of the cross bars is tubular.

* * * * *